United States Patent
Sheinall et al.

(10) Patent No.: US 7,090,242 B1
(45) Date of Patent: Aug. 15, 2006

(54) PET STROLLER ASSEMBLY

(76) Inventors: Tarrin Jamil Sheinall, 5515 Bagley Ct., Sacramento, CA (US) 95841; Jean E. Eckford, 5515 Bagley Ct., Sacramento, CA (US) 95841

( * ) Notice: Subject to any disclaimer, the term of this patent is extended or adjusted under 35 U.S.C. 154(b) by 61 days.

(21) Appl. No.: 10/870,581

(22) Filed: Jun. 18, 2004

(51) Int. Cl.
  *B62B 1/00* (2006.01)
(52) U.S. Cl. ............ 280/657; 280/47.38; 119/496
(58) Field of Classification Search ........ 119/496, 119/497, 727; 280/642, 643, 644, 647, 648, 280/649, 657, 658, 47.34, 47.38
See application file for complete search history.

(56) References Cited

U.S. PATENT DOCUMENTS

| | | | |
|---|---|---|---|
| 1,412,935 A * | 4/1922 | Greenebaum ............ 5/416 |
| 4,116,465 A * | 9/1978 | Maclaren ............ 280/647 |
| 5,092,270 A * | 3/1992 | Simons et al. ............ 119/453 |
| 5,113,793 A | 5/1992 | Leader et al. |
| 5,277,148 A * | 1/1994 | Rossignol et al. ............ 119/453 |
| 5,282,439 A * | 2/1994 | Oaks ............ 119/482 |
| 5,354,079 A * | 10/1994 | Hettenbach ............ 280/33.991 |
| 5,887,436 A * | 3/1999 | Duddleston ............ 62/3.62 |
| 6,155,206 A * | 12/2000 | Godshaw ............ 119/453 |
| 6,223,691 B1 | 5/2001 | Beattie |
| D445,965 S | 7/2001 | Licciardello |
| 6,267,080 B1 | 7/2001 | Roy |
| D453,593 S * | 2/2002 | Licciardello ............ D30/109 |
| 6,374,775 B1 | 4/2002 | Baumsteiger |
| 6,446,577 B1 * | 9/2002 | Salahor ............ 119/497 |
| 6,490,995 B1 * | 12/2002 | Greene, Jr. ............ 119/496 |
| D475,660 S * | 6/2003 | Licciardello ............ D12/129 |
| 6,581,945 B1 | 6/2003 | Shapiro |
| 6,584,937 B1 | 7/2003 | Ludolph |
| 6,786,181 B1 * | 9/2004 | Leanheart ............ 119/453 |

* cited by examiner

*Primary Examiner*—Christopher P. Ellis
*Assistant Examiner*—Brian Swenson (57) ABSTRACT

A pet stroller assembly includes an open topped housing that has a bottom wall and a peripheral wall being attached to and extending upwardly from the bottom wall. A plurality of legs is attached to and extends downwardly from the bottom wall. Each of a plurality of wheels is rotatably coupled to one of the legs. A handle is attached to the housing. A canopy is hingedly coupled to the housing and is selectively positioned in a closed position abutting the peripheral wall or in an open position extending upwardly from the peripheral wall. The canopy extends at least 3 inches upwardly from the peripheral wall when the canopy is in the closed position.

14 Claims, 9 Drawing Sheets

PET STROLLER ASSEMBLY

BACKGROUND OF THE INVENTION

1. Field of the Invention

The present invention relates to stroller devices and more particularly pertains to a new stroller device for carrying and transporting an animal such as a dog or cat in such a manner that the animal may view outwardly of the device while being restrained therein.

2. Description of the Prior Art

The use of stroller devices is known in the prior art. U.S. Pat. No. 6,584,397 describes a conventional baby stroller that includes a covering for retaining an animal therein. Another type of stroller device is U.S. Pat. No. 6,374,775 that is essentially a cart for transporting a conventional kennel. Another such device is U.S. Pat. No. 6,267,080 that includes a cage device having wheels fitted thereto for the transportation of pets. Yet another device for transporting a pet is shown in U.S. Pat. Des. No. 445,965. This patent shows a cart having a cover that is removable from the cart.

While these devices fulfill their respective, particular objectives and requirements, the need remains for a device that includes a better assembly for covering a stroller and which can be modified depending on its use and the temperament of the animal being transported. In particular it should have a covering that is positionable in an open position and that also includes a retractable section therein so that a portion of the covering may be opened.

SUMMARY OF THE INVENTION

The present invention meets the needs presented above by generally comprising an open topped housing that has a bottom wall and a peripheral wall being attached to and extending upwardly from the bottom wall. A plurality of legs is attached to and extends downwardly from the bottom wall. Each of a plurality of wheels is rotatably coupled to one of the legs. A handle is attached to the housing. A canopy is hingedly coupled to the housing and is selectively positioned in a closed position abutting the peripheral wall or in an open position extending upwardly from the peripheral wall. The canopy extends at least 3 inches upwardly from the peripheral wall when the canopy is in the closed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 10 thereof, a new stroller device embodying the principles and concepts of the present invention and generally designated by the reference numeral 10 will be described.

Figure 1:
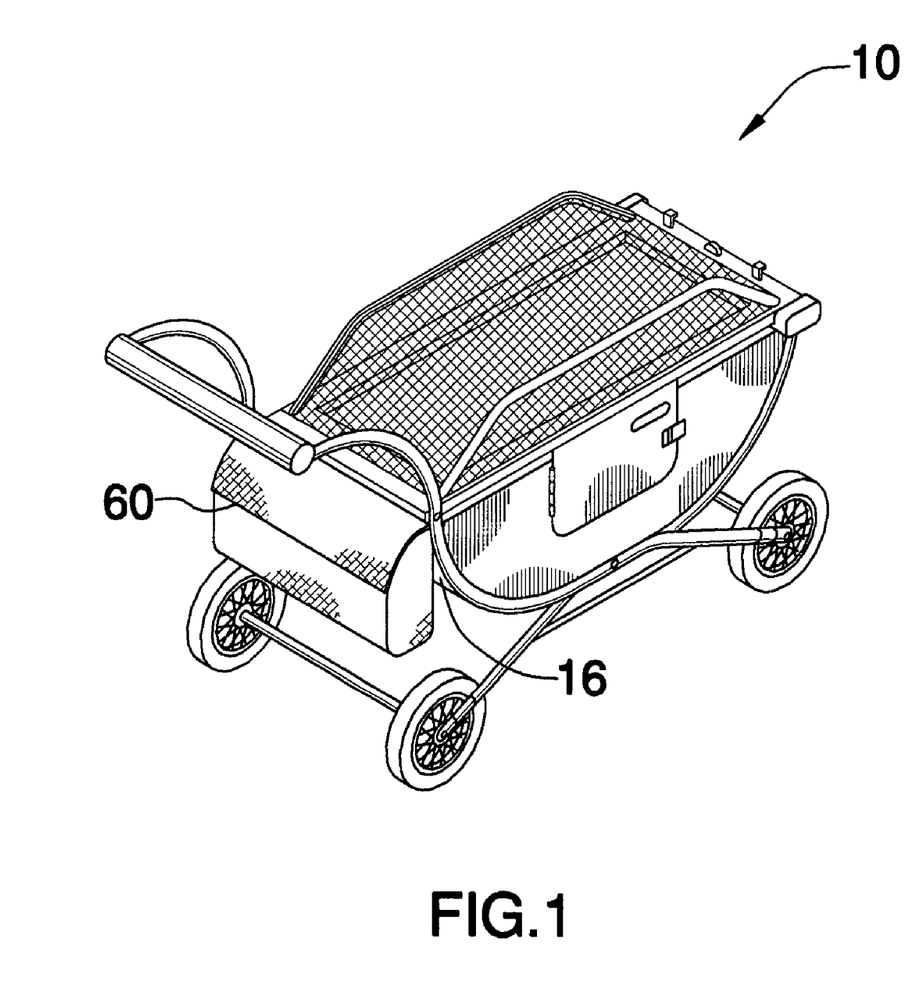
FIG. 1 is a perspective view of a pet stroller assembly according to the present invention.
Figure 2:
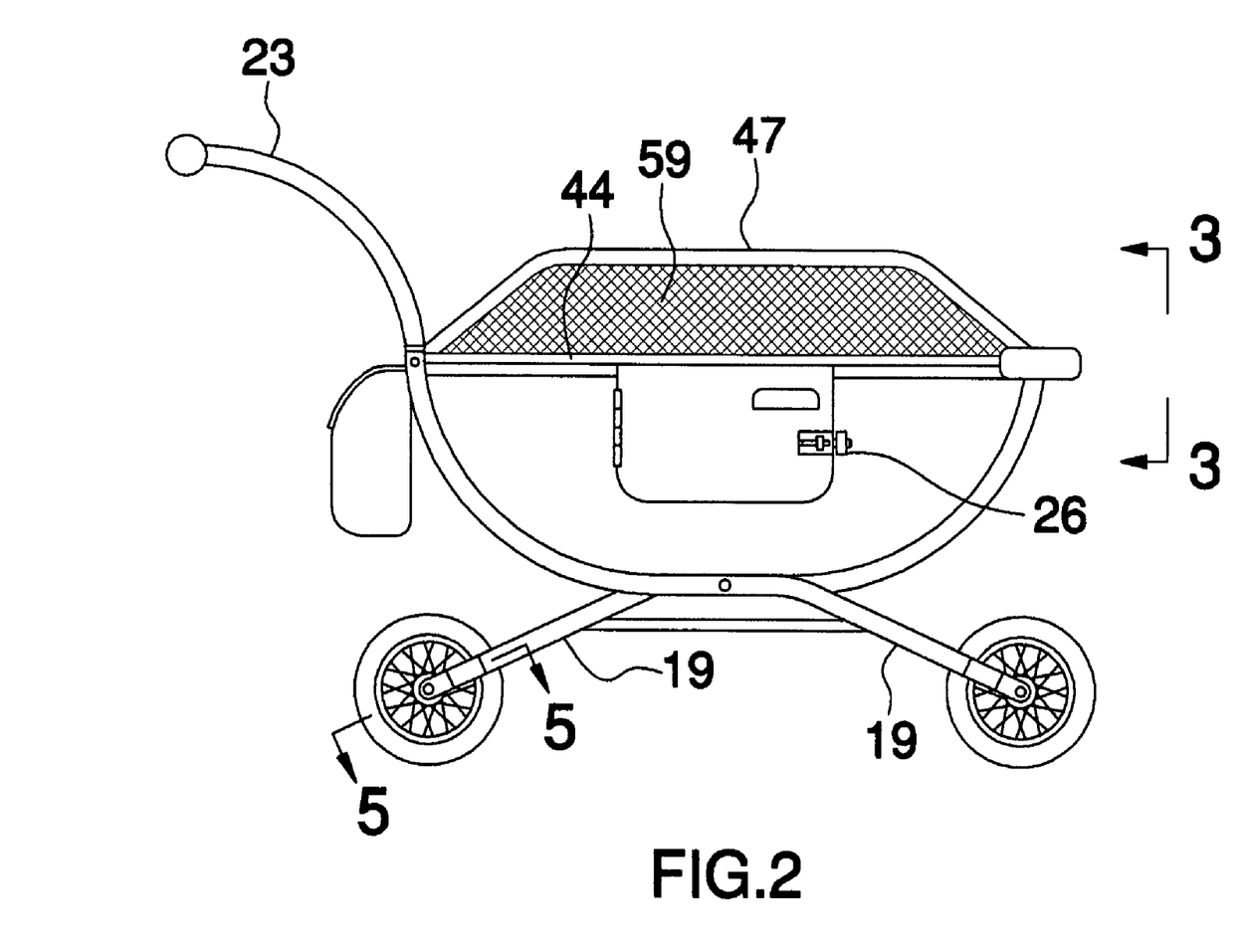
FIG. 2 is a first side view of the present invention.
Figure 3:
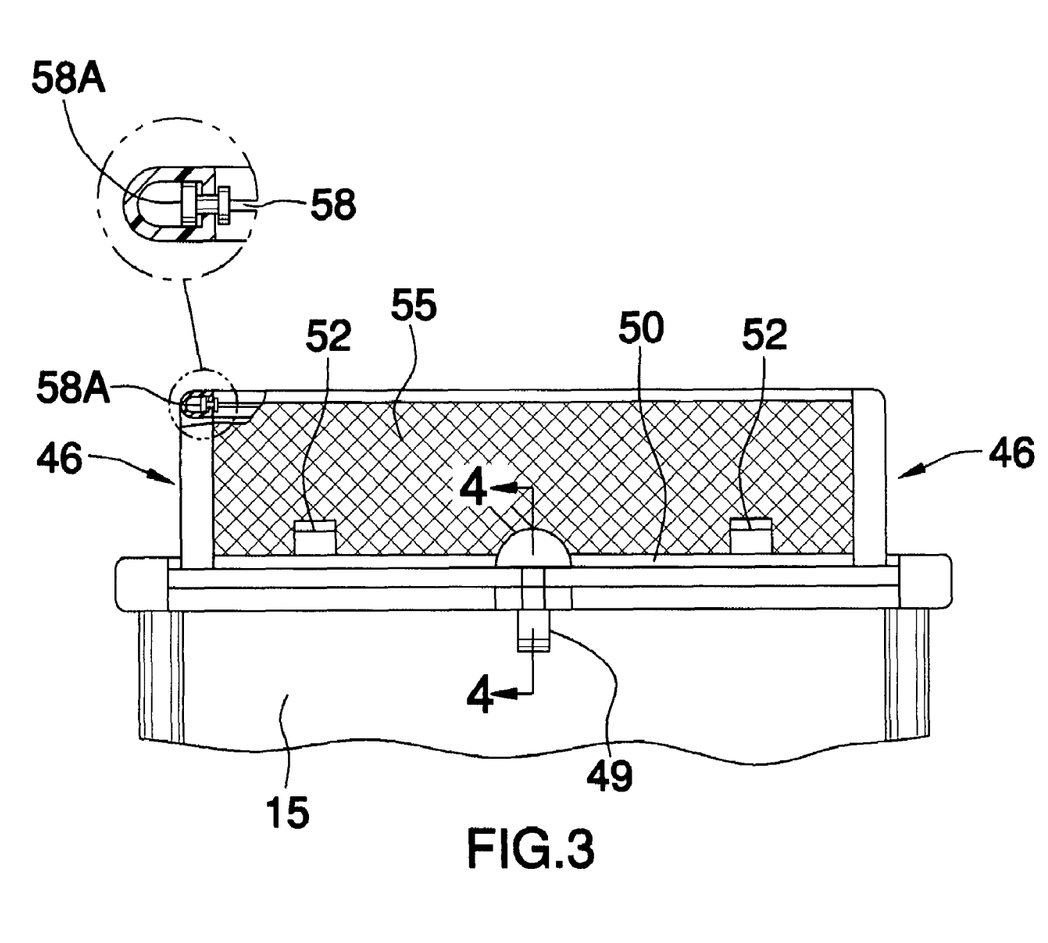
FIG. 3 is a front view of the present invention.
Figure 4:
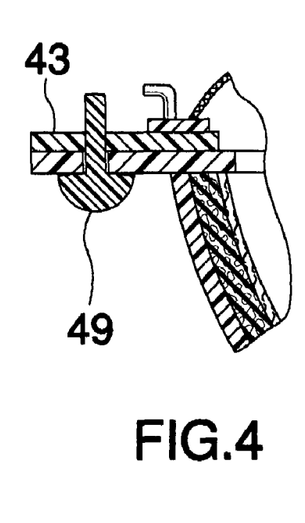
FIG. 4 is a cross-sectional view taken along line 4—4 of the present invention.
Figure 5:
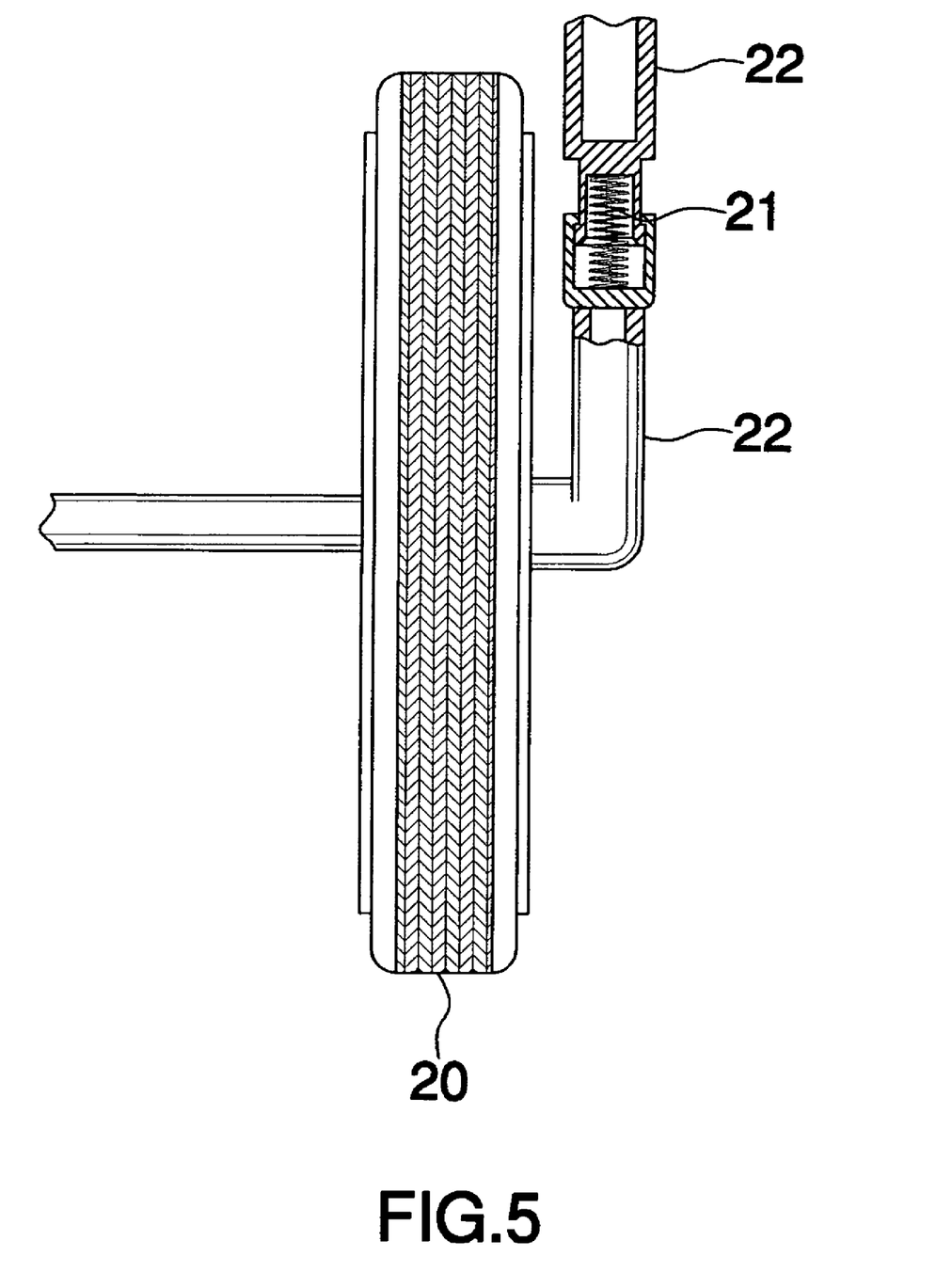
FIG. 5 is an enlarged view of a wheel of the present invention.
Figure 6:
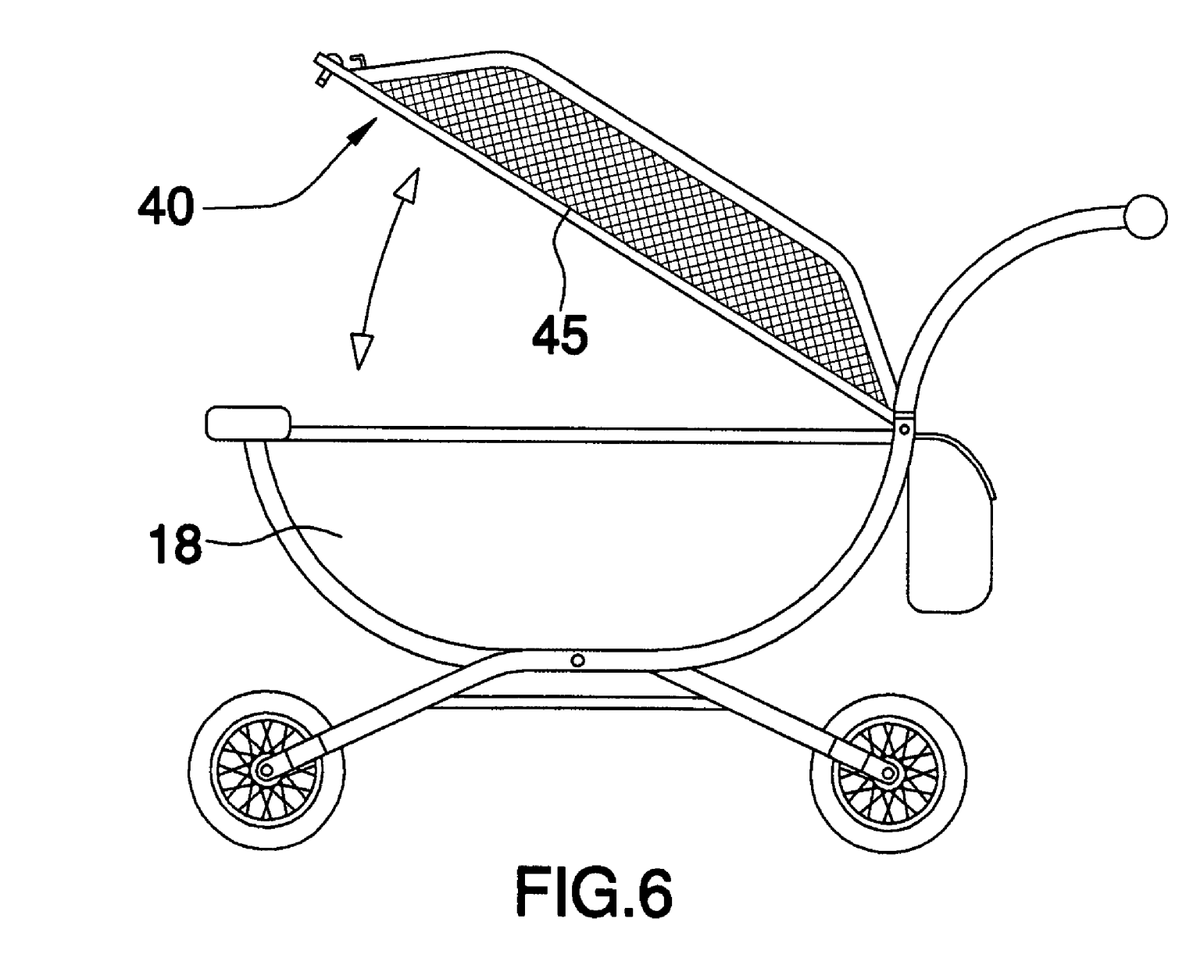
FIG. 6 is a second side of the present invention.
Figure 7:
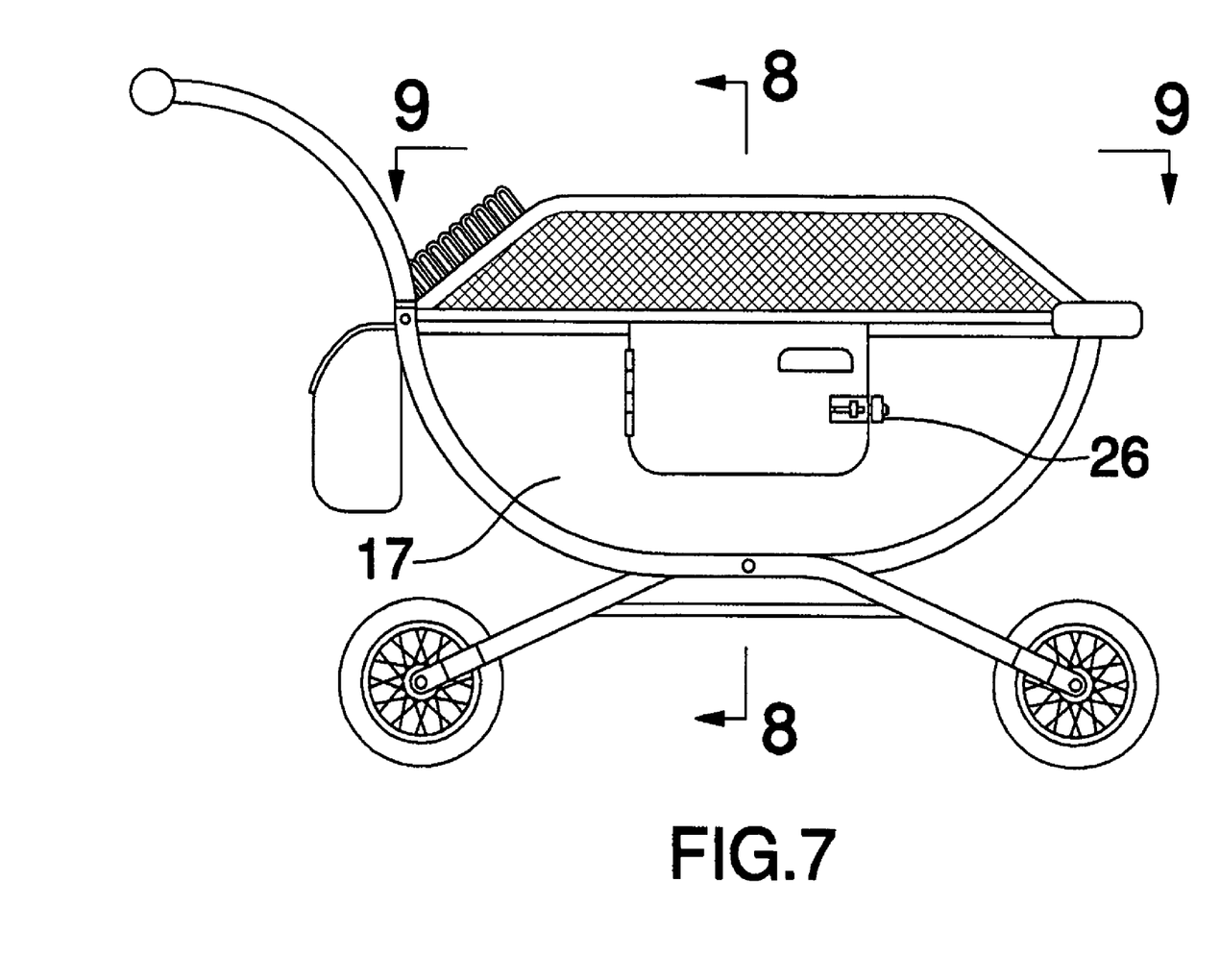
FIG. 7 is a first side view of the present invention.
Figure 8:
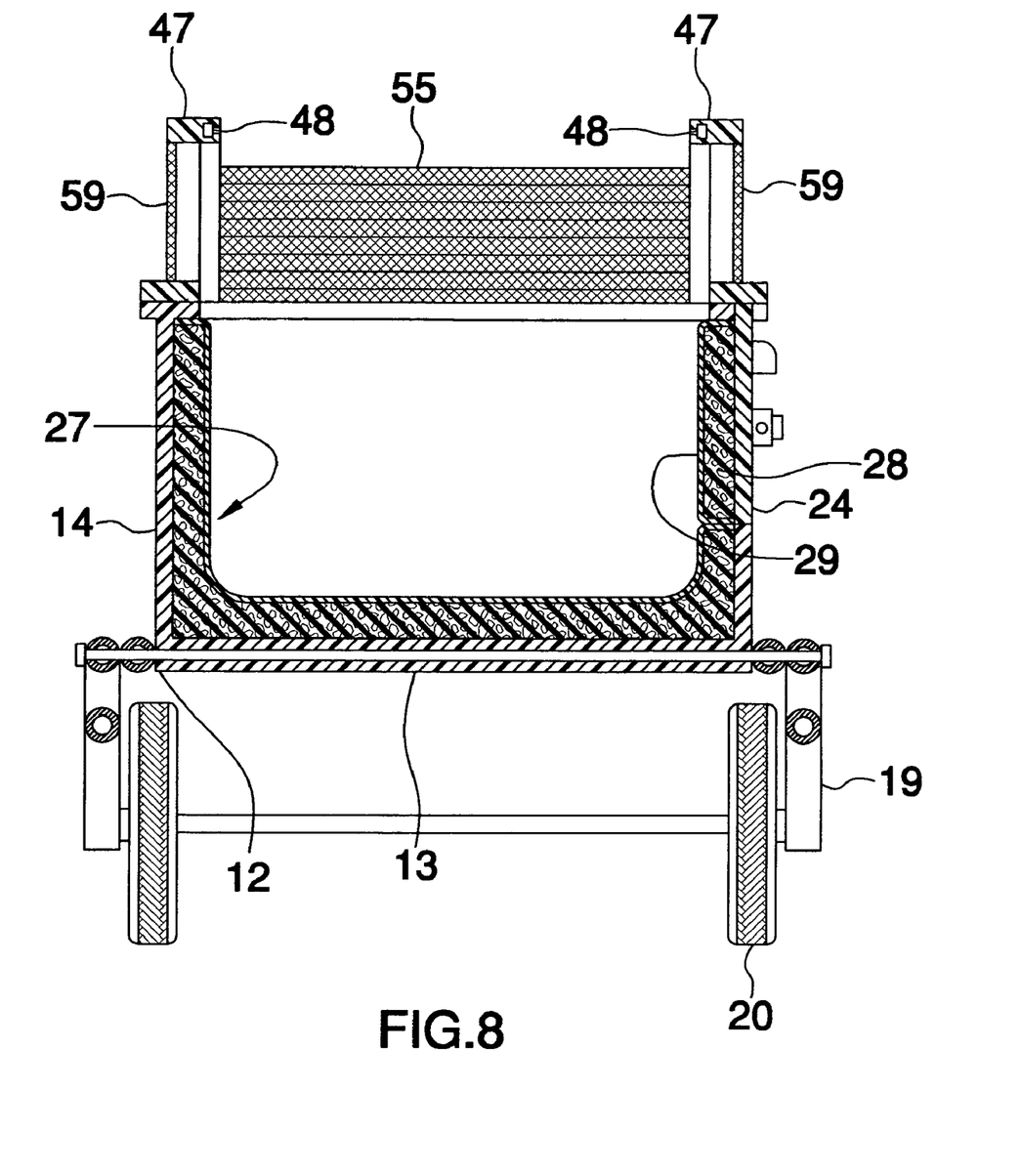
FIG. 8 is a cross-sectional view taken along line 8—8 of FIG. 7 of the present invention.
Figure 9:
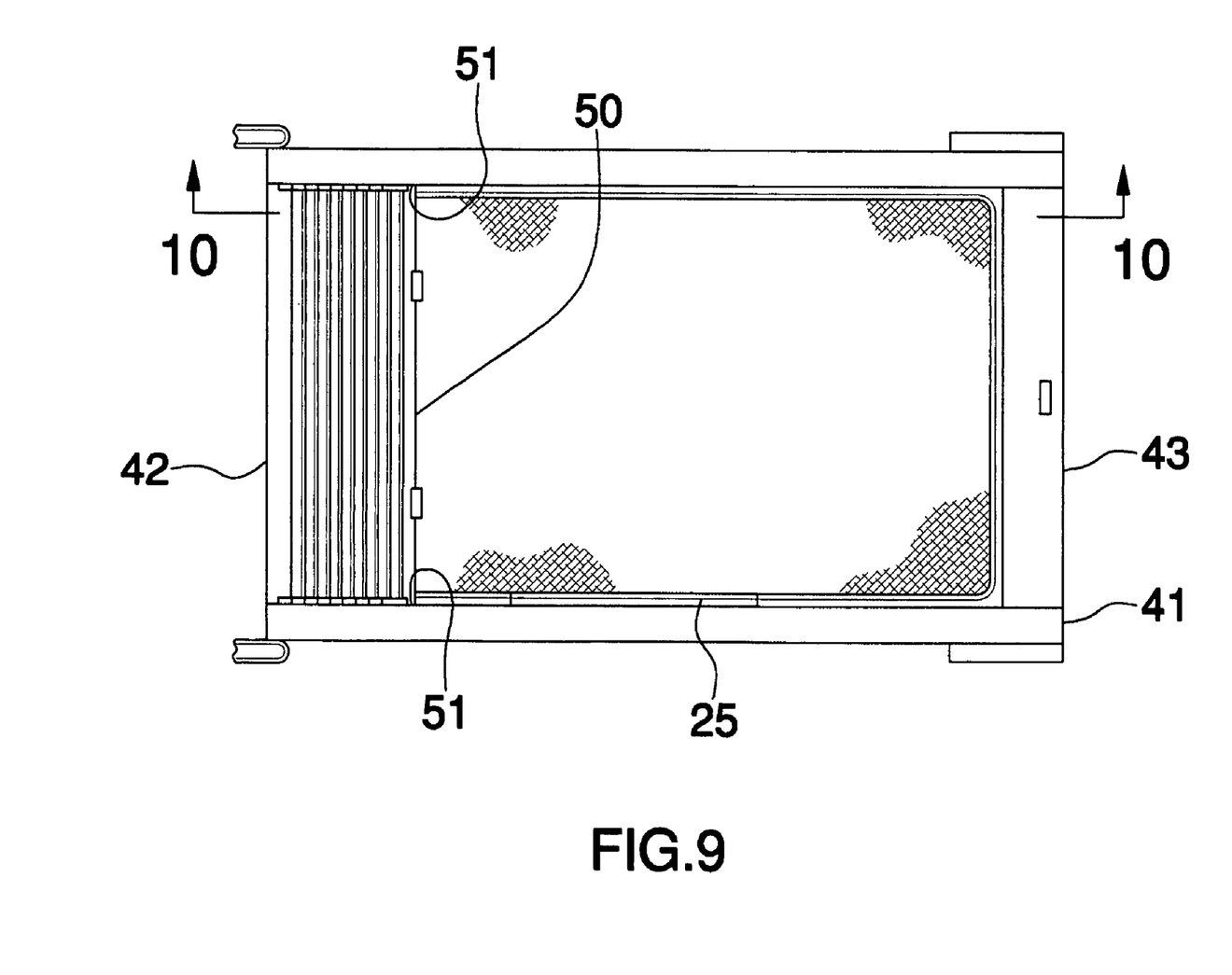
FIG. 9 is a top view taken along line 9—9 of FIG. 7 of the present invention.
Figure 10:
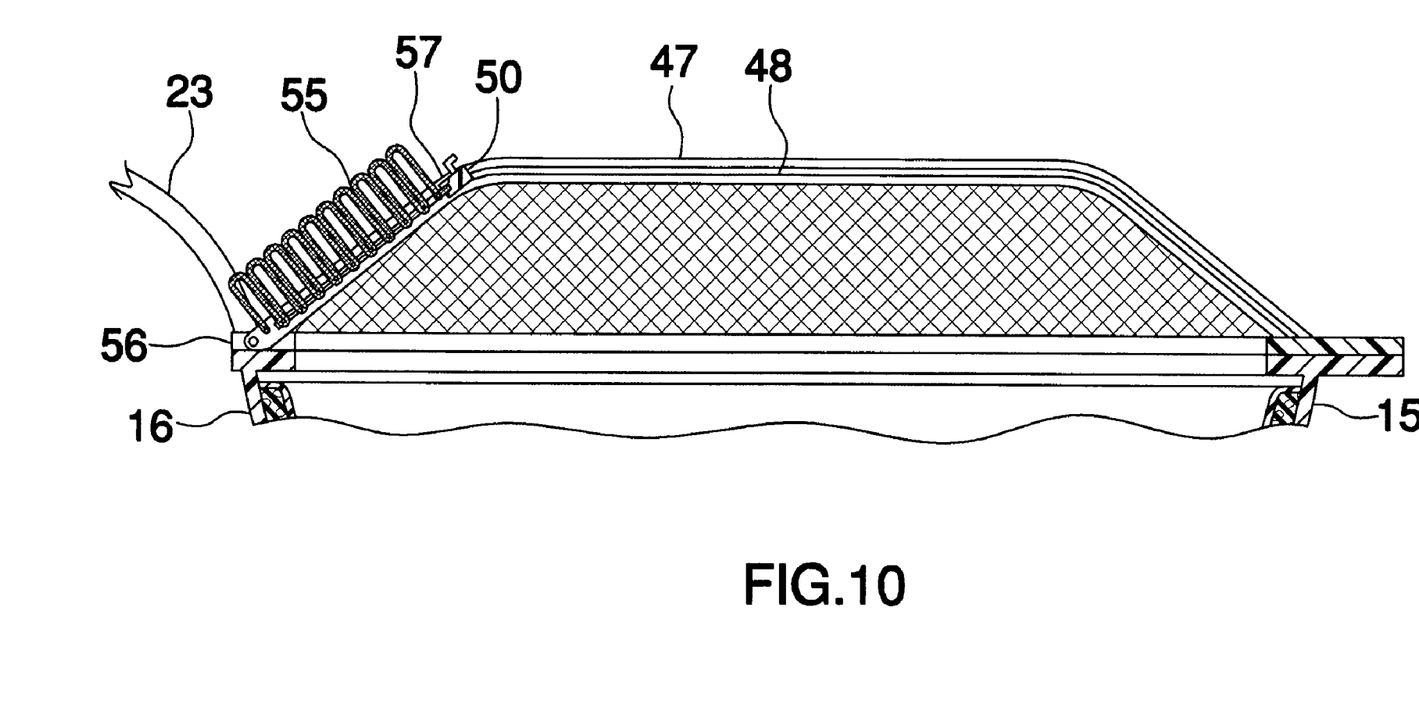
FIG. 10 is a cross-sectional view taken along line 10—10 of FIG. 9 of the present invention.

As best illustrated in FIGS. 1 through 10 the pet stroller assembly 10 generally comprises an open topped housing 12 that has a bottom wall 13 and a peripheral wall 14 that is attached to and extends upwardly from the bottom wall 13. The peripheral wall 14 includes a front wall 15, a back wall 16, a first side wall 17 and a second side wall 18. A plurality of legs 19 is attached to and extends downwardly from the bottom wall 13. Each of a plurality of wheels 20 is rotatably coupled to one of the legs 19. Rotatably coupling each of the wheels 20 to the legs 19 individually or positioning the wheels 20 on axles extending between the legs 19 may accomplish this. A plurality of shock absorbers 21 is preferably included. Each of the shock absorbers 21 is mounted to one of the legs 19 so that the shock absorbers 21 are positioned between each of the wheels 20 and the bottom wall 13. The shock absorbers 21 preferably include compression springs mounted in sections 22 of the legs 19 that are movable with respect to each other. A handle 23 is attached to the housing 12. The handle 23 is positioned adjacent to and extends upwardly and away from the back wall 16. The legs 19 and handle 23 may form continuous sections as shown in FIG. 7 so that they also define a house frame for the bottom 13 and peripheral 14 walls to be attached to. The front 15 and back 16 walls are preferably curved outwardly and upwardly from the bottom wall 13.

A door 24 is positioned in the first lateral wall 17. The door 24 extends upwardly to and through an upper edge 25 of the first lateral wall 17. The door 24 allows for the easy positioning of larger dogs into the housing 12. A locking member 26 may be mounted on the door 24 for selectively locking the door 24 when it is closed. A cushioning material 27 is attached to and substantially covers an interior surface of the housing 12 and the door 24. The cushioning material 27 includes an inner layer 28 of resiliently compressible material and an outer layer 29 of a flexible water resistant material. The water resistant layer, or outer layer 29, is preferably comprised of a plastic or elastomeric material. The water resistant layer 29 allows for easy clean-up of the housing 12 should an animal urinate or defecate therein.

A canopy 40 is hingedly coupled to the housing 12 and is selectively positioned in a closed position abutting the peripheral wall 14 or in an open position extending upwardly from the peripheral wall 14. The canopy 40 extends at least 3 inches upwardly from the peripheral wall 14 when the canopy 40 is in the closed position. This allows a dog to place their head above the level of the peripheral wall 14 to see through the canopy 40. The canopy 40 includes a base frame 41 that comprises a loop member having a size and shape corresponding to an upper edge of the peripheral wall 14. The base frame 41 includes a back portion 42, front portion 43, a first side portion 44 and a second side portion 45. Each of a pair of vertical frames 46 is attached to and extends upwardly from one of each of the first 44 and second 45 side portions. Each of the vertical frames 46 has an upper elongated portion defining rails 47. Each of the rails 47 has an inner side with respect to each other. The inner sides of the rails 47 each have an elongated slot 48 therein extending from the back portion 42 to the front portion 43. A locking member 49 may be mounted on the canopy 40 for locking the canopy 40 in the closed position.

A rod 50 is elongated and has a pair of ends 51. Each of the ends 51 is positioned in one the slots 48 such that the rod 50 extends between the rails 47. The ends 51 of the rod 50 are selectively movable along the slots 48 so that rods can be moved along the rails 47 but are not removed from the rails 47. At least one gripping member 52 is attached to the rod 50 for aiding in the movement of the rod 50 along the rails 47.

An upper screen 55 has a rear edge 56 and a forward edge 57. The rear edge 56 is attached to and extends along the back portion 42 and the forward edge 57 is attached to and extends along the rod 50. The upper screen 55 may be selectively moved from a covered position extending substantially along the length of the vertical frames 46 or an uncovered position wherein the rod 50 is positioned nearer the back portion 42 than the front portion 43. A plurality of shafts 58 may be attached to the upper cover 55 and their ends 58A extended into the slots 48 for retaining the upper screen 55 in alignment with the rails 47. A pair of lateral screens 59 is also provided. Each of the lateral screens 59 is attached to and covers one of the vertical frames 46. The upper 55 and lateral 59 screens are mesh material preferably comprised of a cloth or flexible synthetic material that is air permeable and substantially transparent.

At least one pouch 60 is attached to the housing 12. The pouch 60 is preferably positioned adjacent to the back wall 14. The pouch 60 may be used for holding water, bags and other items.

In use, the canopy 40 is placed in the open position and a dog placed in the housing 12. The canopy 40 is closed to keep the dog from jumping out of the housing. The canopy 40 is high enough to allow the dog to see over the edge of the peripheral wall 14. If there is little danger of the dog jumping out of the housing 12, the rod 50 may be moved to place the upper screen 55 in the uncovered position while the lateral screens 59 continue to aid in the containment of the dog.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pet stroller assembly comprising:
an open topped housing having a bottom wall and a peripheral wall being attached to and extending upwardly from said bottom wall, a plurality of legs being attached to and extending downwardly from said bottom wall, a plurality of wheels being rotatably coupled to one of said legs, a handle being attached to said housing, said peripheral wall including a front wall, a back wall, a first side wall and a second side wall; and
a canopy being hingedly coupled to said housing and being selectively positioned in a closed position abutting said peripheral wall or in an open position extending upwardly from said peripheral wall, said canopy extending at least 3 inches upwardly from said peripheral wall when said canopy is in said closed position, said canopy including:
a base frame comprising a loop member having a size and shape corresponding to an upper edge of said peripheral wall, said base frame including a back portion, front portion, a first side portion and a second side portion;
a pair of vertical frames, each of said vertical frames being attached to and extending upwardly from one of each of said first and second side portions, each of said vertical frames having an upper elongated portion defining rails,
a rod being elongated and having a pair of ends, each of said ends being attached to and extending between said rails such that said rod may be selectively moved along said rails; and
an upper screen having a rear edge and a forward edge, said rear edge being attached to and extending along said back portion and said forward edge being attached to and extending along said rod, wherein said upper screen may be selectively moved from a covered position extending substantially along the length of said vertical frames or an uncovered position wherein said rod is positioned nearer said back portion than said front portion.

2. The assembly according to claim 1, further including each of a plurality of shock absorbers, each of said shock absorbers being mounted to one of said legs such that said shock absorbers are positioned between each of said wheels and said bottom wall.

3. The assembly according to claim 1, wherein said handle is positioned adjacent to and extending upwardly and away from said back wall.

4. The assembly according to claim 1, further including a door being positioned in said first lateral wall, said door extending upwardly to and through an upper edge of said first lateral wall.

5. The assembly according to claim 1, further including a cushioning material being attached to and substantially covering an interior surface of said housing.

6. The assembly according to claim 1, further including a pair of lateral screens, each of said lateral screens being attached to and covering one of said vertical frames.

7. The assembly according to claim 1, further including at least one gripping member being attached to said rod.

8. The assembly according to claim 1, further including a pouch being attached to said housing, said pouch being positioned adjacent to said back wall.

9. A pet stroller assembly comprising:
an open topped housing having a bottom wall and a peripheral wall being attached to and extending upwardly from said bottom wall, said peripheral wall including a front wall, a back wall, a first side wall and a second side wall, a plurality of legs being attached to and extending downwardly from said bottom wall, a plurality of wheels being rotatably coupled to one of said legs, each of a plurality of shock absorbers, each of said shock absorbers being mounted to one of said legs such that said shock absorbers are positioned between each of said wheels and said bottom wall, a handle being attached to said housing, said handle being positioned adjacent to and extending upwardly and away from said back wall;

a door being positioned in said first lateral wall, said door extending upwardly to and through an upper edge of said first lateral wall;

a cushioning material being attached to and substantially covering an interior surface of said housing, said cushioning material including an inner layer of resiliently compressible material and an outer layer of a flexible water resistant material;

a canopy being hingedly coupled to said housing and being selectively positioned in a closed position abutting said peripheral wall or in an open position extending upwardly from said peripheral wall, said canopy extending at least 3 inches upwardly from said peripheral wall when said canopy is in said closed position, said canopy including;

a base frame comprising a loop member having a size and shape corresponding to an upper edge of said peripheral wall, said base frame including a back portion, front portion, a first side portion and a second side portion;

a pair of vertical frames, each of said vertical frames being attached to and extending upwardly from one of each of said first and second side portions, each of said vertical frames having an upper elongated portion defining rails, each of said rails having an inner side with respect to each other having an elongated slot therein extending from said back portion to said front portion;

a rod being elongated and having a pair of ends, each of said ends being positioned in one said slots such that said rod extends between said rails, said ends of said rod being selectively movable along said slots;

an upper screen having a rear edge and a forward edge, said rear edge being attached to and extending along said back portion and said forward edge being attached to and extending along said rod, wherein said upper screen may be selectively moved from a covered position extending substantially along the length of said vertical frames or an uncovered position wherein said rod is positioned nearer said back portion than said front portion;

a pair of lateral screens, each of said lateral screens being attached to and covering one of said vertical frames;

at least one gripping member being attached to said rod; and a pouch being attached to said housing, said pouch being positioned adjacent to said back wall.

10. A pet stroller assembly comprising:

an open topped housing having a bottom wall and a peripheral wall being attached to and extending upwardly from said bottom wall, a plurality of legs being attached to and extending downwardly from said bottom wall, each of said legs having at least one wheel rotatably coupled thereto, a handle being attached to said housing, said peripheral wall including a front wall, a back wall, a first side wall and a second side wall;

a door being positioned in said first lateral wall, said door extending upwardly to and through an upper edge of said first lateral wall; and a canopy being hingedly coupled to said housing and being selectively positioned in a closed position abutting said peripheral wall or in an open position extending upwardly from said peripheral wall, said canopy extending at least 3 inches upwardly from said peripheral wall when said canopy is in said closed position, said canopy including:

a base frame comprising a loop member having a size and shape corresponding to an upper edge of said peripheral wall, said base frame including a back portion, front portion, a first side portion and a second side portion;

a pair of vertical frames, each of said vertical frames being attached to and extending upwardly from one of each of said first and second side portions, each of said vertical frames having an upper elongated portion defining rails, a rod being elongated and having a pair of ends, each of said ends being attached to and extending between said rails such that said rod may be selectively moved along said rails;

an upper screen having a rear edge and a forward edge, said rear edge being attached to and extending along said back portion and said forward edge being attached to and extending along said rod, wherein said upper screen may be selectively moved from a covered position extending substantially along the length of said vertical frames or an uncovered position wherein said rod is positioned nearer said back portion than said front portion;

a pair of lateral screens, each of said lateral screens being attached to and covering one of said vertical frames; and at least one gripping member being attached to said rod.

11. The assembly according to claim 10, further including each of a plurality of shock absorbers, each of said shock absorbers being mounted to one of said legs such that said shock absorbers are positioned between each of said wheels and said bottom wall.

12. The assembly according to claim 10, wherein said handle is positioned adjacent to and extending upwardly and away from said back wall.

13. The assembly according to claim 10, further including a cushioning material being attached to and substantially covering an interior surface of said housing.

14. The assembly according to claim 10, further including a pouch being attached to said housing, said pouch being positioned adjacent to said back wall.

* * * * *